(12) United States Patent
Narita et al.

(10) Patent No.: US 8,919,399 B2
(45) Date of Patent: Dec. 30, 2014

(54) TIRE TREAD

(75) Inventors: Nobutaka Narita, Clermont-Ferrand (FR); Florence Tran, Saint-Genest-L'Enfant (FR)

(73) Assignees: Compagnie Generale des Etablissements, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 798 days.

(21) Appl. No.: 13/133,134

(22) PCT Filed: Nov. 26, 2009

(86) PCT No.: PCT/EP2009/065919
§ 371 (c)(1),
(2), (4) Date: Aug. 22, 2011

(87) PCT Pub. No.: WO2010/063641
PCT Pub. Date: Jun. 10, 2010

(65) Prior Publication Data
US 2012/0024442 A1 Feb. 2, 2012

(30) Foreign Application Priority Data
Dec. 5, 2008 (FR) ..................................... 08 58298

(51) Int. Cl.
*B60C 11/117* (2006.01)
*B60C 11/03* (2006.01)
(52) U.S. Cl.
CPC ............ *B60C 11/032* (2013.01); *Y10S 152/902* (2013.01)
USPC ..................................... 152/209.17; 152/902
(58) Field of Classification Search
CPC .. B60C 11/03; B60C 11/032; B60C 11/0306; B60C 11/11; B60C 11/12; B60C 11/1204; B60C 11/1259; B60C 11/13
USPC ................. 162/209.17, 209.18, 209.15, 902; 152/209.17, 209.18, 209.15, 902
See application file for complete search history.

(56) References Cited

U.S. PATENT DOCUMENTS 2,909,271 A 9/1956 Taylor

FOREIGN PATENT DOCUMENTS

GB 546975 8/1942
JP 62-55202 A 3/1987
(Continued)

OTHER PUBLICATIONS

Search Report mailed Feb. 25, 2010 for International Application No. PCT/EP2009/065919.
(Continued)

*Primary Examiner* — Eric Hug
(74) *Attorney, Agent, or Firm* — Dickinson Wright PLLC

(57) ABSTRACT

Tread band for a tire having a tread surface and comprising a plurality of recesses of total depth H* opening onto the tread surface, each recess comprising at least two cavities of a first type of cavities, each of these cavities of a first type being delimited by a main wall and having a depth Hi, the main wall of each cavity of the first type is such that its intersection with a virtual surface parallel to the running surface in the new condition and passing through the points of the said wall that are furthest towards the outside of the tread forms an exterior contour that is closed and of length Ce, the main wall of each cavity of the first type is such that its intersection with a virtual surface parallel to the running surface in the new condition and passing through the points of the main wall furthest towards the inside of the tread forms an interior contour which is closed and of length of length Ci, this tread band being characterized in that the cavities of a first type are arranged at different levels in a direction oriented from the tread surface towards the inside of the tread strip, and in that the length Ce of the exterior contour of a cavity is greater than the length Ci of the interior contour of the same cavity.

20 Claims, 2 Drawing Sheets

(56) References Cited

FOREIGN PATENT DOCUMENTS

| | | |
|---|---|---|
| JP | 4-218407 A | 8/1992 |
| JP | 7-81318 A | 3/1995 |
| JP | 10-278510 A | 10/1998 |
| JP | 2005-262973 A | 9/2005 |
| JP | 2008-062749 * | 3/2008 |
| WO | WO 96/15002 A1 | 5/1996 |

OTHER PUBLICATIONS

Search Report dated Apr. 15, 2009 for French Patent Application No. 08/58298.

* cited by examiner

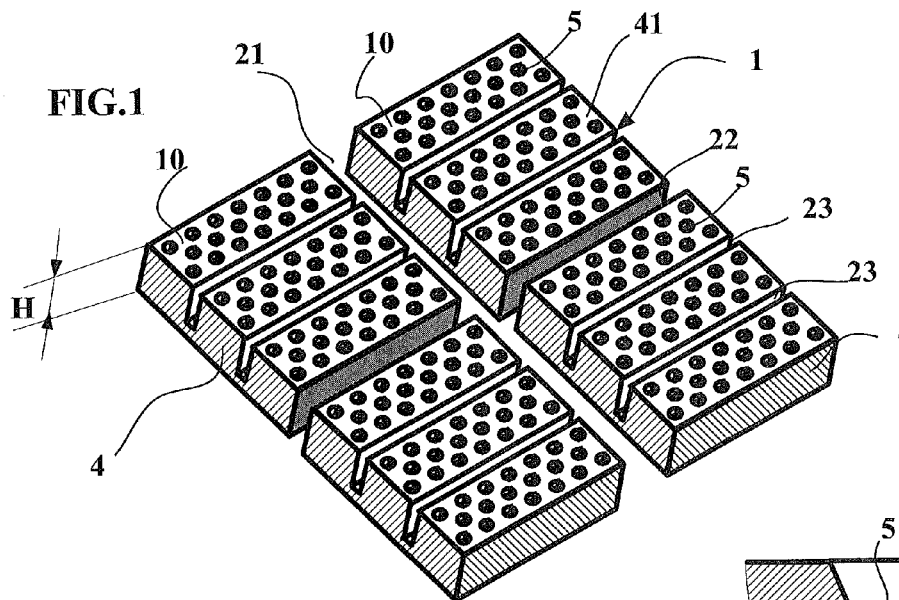
FIG.1
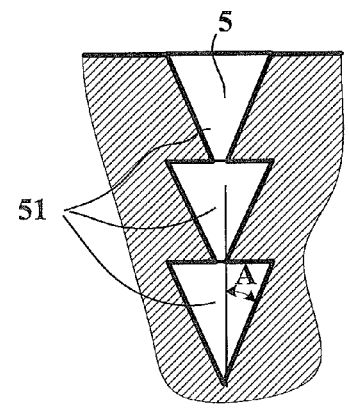
FIG.4
FIG.2
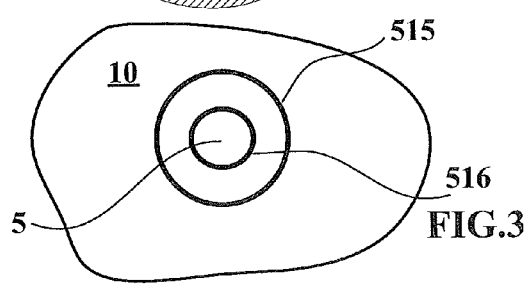
FIG.3
FIG.5

TIRE TREAD

The field of the invention is that of tire treads and, more particularly, the surface condition of the tread surface of such treads at different levels of wear.

Winter driving on roads covered with snow and ice requires a tread band that has a great many edges and hollows in order to increase the coefficient of friction of the tire on the road and provide better grip by storing and/or removing fluid or solid particles present on these roads.

What is meant by storing and/or removing is that the particles are cleared out of direct contact with the tread band and the road surface.

Those skilled in art have proposed various solutions for improving the grip of a tire intended for passenger vehicles throughout substantially the service life of the tire (that is to say before the legal maximum level of tread wear is reached).

Patent application GB 546975-A describes a tread band comprising circumferential ribs which are made softer, more flexible, more compressible and better ventilated in certain regions using groups of small recesses separated from one another or interconnected to one another and distributed circumferentially in the rubber of which the tread band is made without thereby appreciably affecting its stability. These recesses may have an even or uneven shape, a uniform or non uniform cross section and may or may not be inclined with respect to the surface of tread band and may have varying depths.

Patent application JP 2005262973-A describes a tread band comprising incisions which, in the direction of the depth of the tread strip, have wide parts alternating with narrow parts, each of the incisions comprising a wide part opening onto the surface for contact with the road surface located in alternation with an incision comprising a narrow part opening onto the surface for contact with the road surface to allow water to be cleared while at the same time avoiding deformation (flattening) of the surface of the incision.

What is meant by an incision is a very fine cut in the rubber that involves practically no removal of material.

It has been found that the use of such means allows passenger car tires which are not designed to drive on snow- or ice-covered roads to clear water. However, the performance of these tires on ground covered with particles of snow or ice still needs to be improved.

The object of the invention is to provide a technical solution to the stated problem of good grip on a snow-covered or ice-covered road surface right from the first few kilometers of running a new tread and throughout its service life practically up until the time that it has to be replaced as a result of wear.

To this end, the tread band for winter tires according to the invention is provided with a plurality of grooves delimiting elements in relief, these grooves having a mean depth H. This tread band has a tread surface designed to come into contact with the road surface during running and formed by the external surfaces of the various elements in relief which may be blocks or ribs (it being possible for blocks and ribs to be combined within the same tread strip).

This tread band comprises, on a plurality of its elements in relief, a plurality of recesses—or wells—of total depth $H^*$, each recess comprising at least two cavities of a first type of cavity, these cavities being arranged one after the other in a direction oriented from the tread surface towards the inside of the tread band (that is to say in a radial direction). What is meant here by arranged one after the other is that these cavities are arranged so that they succeed one another at different levels in the direction of the thickness of the tread strip, that is to say so that the external contour of a cavity of a first type of recess is located, in the direction of the thickness of the tread, at a distance from the tread surface in the new condition which is greater than or equal to the distance separating the internal contour or the previous cavity from the same tread surface.

This feature is essential because it makes each cavity active on the tread surface independently of the others: as soon as a first cavity has disappeared as a result of partial wear, a new cavity appears and becomes active on the tread surface. The prior art discloses alternative forms comprising several incisions which are closed around one and the same axis delimiting several cavities; however, it does not in any way describe or suggest cavities which succeed one another in the direction of the depth. In document WO 96/15002 it may be seen that the cavities are all substantially active at the same time on the tread surface.

If the total number of cavities of a first type is N, then each cavity of a first type of rank i (i varying from 1 to N) has a depth $H_i$ measured in the direction of the thickness of the tread, $H_i$ being less than the depth $H^*$ of the recess, and is delimited by a main wall. The main wall of each cavity of the first type is such that its intersection with a virtual surface parallel to the running surface in the new condition and passing through the points of the said wall that are furthest towards the outside of the tread forms an exterior contour that is closed and of length Ce. The main wall of each cavity of the first type is such that its intersection with the virtual surface parallel to the running surface in the new condition and passing through the points of the main wall furthest towards the inside of the tread forms an interior contour which is closed and of length of length Ci. Furthermore, the length Ce of the exterior contour of a cavity is greater than the length Ci of the interior contour of the same cavity.

The number N of cavities of a first type situated in the continuation of one another for each recess is an integer ranging from 2 to 8.

In one alternative form of embodiment of the invention, the length Ci of the closed interior contour of at least the cavity furthest towards the inside of the tread (that is to say the cavity of rank N) is equal to zero or substantially close to zero. In another alternative form, the lengths of all the interior contours of all the cavities of a first type of cavity are equal to zero or substantially close to zero. In such an instance, each cavity of a first type may be of conical shape, the vertex of the cone being situated towards the inside of the tread. The angle of the generatrix of the cone preferably being comprised between 2 degrees and 30 degrees.

In a preferred alternative form of embodiment, the lengths of the exterior contours of the walls of the cavities of a first type are all equal to one another.

In a preferred alternative form of embodiment, the interior and exterior contours of the cavities of a first type are of circular shape.

For all the embodiments of the invention, the depth of all the cavities of the first type may be equal to or different from that of each of the other cavities of the first type.

In an alternative form of embodiment of the invention, each cavity of a first type comprises a cavity part of constant section and a part of a variable and decreasing section, the part of constant section being positioned on the inside of the tread in relation to the part of variable section. What is meant by a part of constant section is a cavity of which the intersection of the wall with any virtual surface parallel to the tread surface in the new condition has a contour that is constant both in shape and in length.

In another alternative form of embodiment of the invention, a cavity of a second type is inserted between two cavities of a first type, a cavity of the second type being delimited by a wall of which the intersection with a surface parallel to the tread surface in the new condition and passing through the outermost points of this wall in the tread band forms a closed contour of length equal to the length Ci of the interior contour of the cavity of the first type to which this cavity of the second type is connected. Moreover this cavity of the second type is connected to a first-type cavity of rank i+1 by a contour of a length equal to the length Ce of the exterior contour of the said cavity of rank i+1.

These cavities of a second type have suitable depths for facilitating the transition between two cavities of a first type and notably for facilitating the molding and remolding of the tread provided with such cavities and eliminating or substantially reducing damage caused by rubber being torn away at the time of remolding, particularly when relatively hard rubber is present in at least in a region of the tread strip. For preference, the depths of the cavities of a second type are less than the depths of the cavities of the first type.

In a preferred alternative form of embodiment, the lines of intersection of the closed contour of the main walls of the cavities of the first type and of the second type are lines of circular contour.

By implementing a solution according to the invention it is thus possible to create, on a number of occasions during the life of the tread band as it gradually becomes worn, conditions suited to obtaining improved contact between the tire and the road surface by picking up and storing particles of snow or ice present on the road surface during contact and clearing these particles away outside of contact through a centrifuging effect. This is obtained without as a result significantly affecting the rigidity of the tread. Specifically, using the succession of cavities of the first type it is possible to increase the pressure forces on the regions in contact with the road surface and on numerous occasions to create a volume suited to picking up particles present on the road surface.

In order to obtain an optimum effect, it is preferable for the minimal distance, on the tread surface when the tread is in the new condition, separating two cavities, to be less than or at most equal to 0.4 millimeters (this minimum distance being measured on the tread surface with the tread in the new condition).

Advantageously, the exterior contours of the cavities of all the recesses opening onto the tread surface are of a geometry suited to being adjacent to one another so as to create lines of contact in order to increase the contact pressures along these lines and make it easier in the new condition for solid particles to be collected towards the inside of the recesses. In such an alternative form, the areas for contact between the tread and the road surface are reduced to these lines of contact.

It is also advantageous for the diameter of the cavities of the first type to be at least equal to 0.8 millimeters and at most equal to 1.6 millimeters. When the diameter is less than 0.8 millimeters, there are difficulties in remolding the recess without damaging it and when the diameter is greater than 1.6 millimeters the effectiveness of the recess is significantly reduced. The total volume of the cavities of the recesses of the first type and of the second type per unit area on the tread surface is at least equal to 0.25 cubic millimeters and at most equal to 20 cubic millimeters.

Other features and advantages of the invention will become apparent from the description given hereinafter with reference to the accompanying drawings which, by way of non-limiting examples, depict some embodiments of the subject matter of the invention.

FIG. 1 shows part of a tread surface of a tread band according to the invention intended for a tire for winter use for a passenger vehicle, this tread band being provided with a plurality of recesses opening onto the tread surface;

FIG. 2 shows a view in cross section of a recess made up, in the radial direction leading towards the inside of the tread strip, of four cavities of a first type, each of these cavities being of frustoconical shape;

FIG. 3 shows a view of the tread surface around a recess like the one depicted in FIG. 2;

FIG. 4 is a view in cross section of a recess formed of three cavities of a first type of conical shape;

FIG. 5 is a view in cross section of a recess consisting, in the radial direction leading towards the inside of the tread strip, of four cavities of a first type, each of these cavities comprising a part of frustoconical shape and a part of cylindrical shape;

Figure 6:
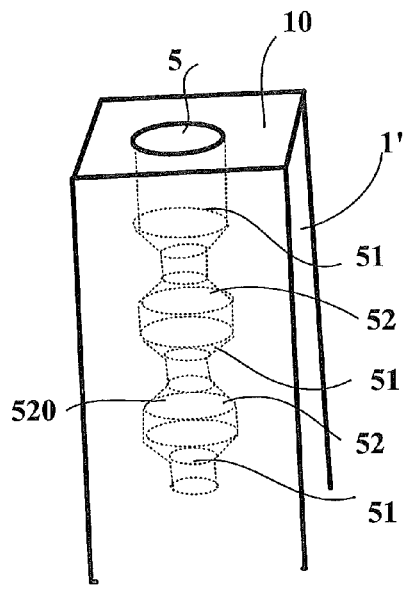
FIG. 6 is a cross section of a block of rubber comprising a recess consisting, in the radial direction leading towards the inside of the tread strip, of a succession of cavities of a first type and of cavities of a second type.

To make the figures and the associated description easier to study, the same references are used in the drawings to denote structural or functional elements which are identical regardless of the alternative form of embodiment considered.

In general, a tread band according to the invention comprises a plurality of recesses opening onto the tread surface in the new condition. Each recess is formed of a succession of cavities, each cavity having a rank i, this rank ranging from 1 (which corresponds to the cavity that opens onto the tread surface in the new condition) to N (which corresponds to the cavity furthest towards the inside of the tread).

FIG. 1 shows part of a tread band 1 according to the invention for a winter tire intended to be fitted to a passenger vehicle. This tread band part comprises a tread surface 10 intended to come into contact with the road surface while the tire provided with this tread band 1 is being driven. It is possible to make out longitudinal grooves 21 and transverse grooves 22 delimiting elements in relief 4, which in this particular instance are in the form of blocks. Each block 4 comprises a contact face 41 forming part of the tread surface 10 of the tread band and lateral faces delimiting the longitudinal and transverse grooves. These grooves 21, 22 have the same mean depth H equal in this instance to 8 mm. Further, each block is provided with incisions 23 directed in the transverse direction (parallel to the axis of rotation of the tire) and of the depth less than the height H of the blocks.

Furthermore, a plurality of recesses 5 of total depth H* have been formed on this tread band 1 in the new condition and on each element in relief 4, as can be seen in FIG. 2 which shows a local cross section through the element in relief taken in the vicinity of a recess 5. Each recess 5 is formed of four cavities 51 of a first type of cavity, each of these cavities 51 of a first type being delimited by a main wall 510 and having a depth H1 measured in the direction of the thickness of the tread. All the cavities 51 have the same depth in this particular instance; this depth is therefore equal to one quarter of the depth H* of the recess 5.

The main wall 510 of each cavity 51 of the first type is such that its intersection with a virtual surface parallel to the tread surface in the new condition and passing through the points 515 of the said wall that are furthest towards the outside of the tread forms an exterior contour which is circular and closed and of length Ce.

The main wall 510 of each cavity 51 of the first type is such that its intersection with a virtual surface parallel to the tread surface in the new condition and passing through the points 516 of the said main wall 510 that are furthest towards the inside of the tread forms an interior contour which is closed and of length of length Ci.

This tread band is such that the cavities 51 are arranged at different levels of wear in a direction directed from the tread surface 10 towards the inside of the tread band and in that the length Ce of the exterior contour of a cavity is greater than the length Ci of the interior contour of that same cavity 51.

Each cavity 51 has a frustoconical shape with an axis substantially perpendicular to the contact face of the block in which it is formed. All the lengths of the exterior contours of the walls of the cavities 51 are all equal to one another.

FIG. 3 shows the tread surface 10 in the vicinity of a recess 5. It is possible to make out a circular edge 515 formed on the tread surface, this edge of circular shape having a length Ce. It is possible to make out a circular edge 516 formed on the inside of the tread band and situated at the points furthest towards the inside of the first cavity. This edge of circular shape 516 has a length Ci which is less than the length Ce.

Thus, when the tread is in the new condition, the tread surface comprises a very high number of recesses 5 which encourage the collection of particles present on the road surface, particularly when driving under winter conditions. The frustoconical shape encourages this collection by increasing the contact pressure on the edge in contact with the road surface. By renewing the initial shape, it is possible to return to conditions substantially identical to the conditions of the tread band when it was new. In this particular instance, these conditions are regained four times throughout the wearing of the tread.

In order to mould such a recess, it is easy to produce a molding element that has a geometry that complements that of these recesses. The elastic nature of the rubbery materials used allows these molding elements to be demolded even though the chosen geometry offers a little resistance to remolding, particularly as a result of the angular parts 11 of the material.

Advantageously, the minimum distance, on the tread surface when the tread band is in the new condition, separating two recesses is less than or at the most equal to 0.4 millimeters. This distance is measured as the minimum distance between two adjacent exterior contours.

FIG. 4 shows an alternative form of recess 5 in which the lengths Ci of all the interior contours of all the cavities 51 of a first type of cavity are equal to zero. In industry practice, provision may be made for these lengths to be substantially close to zero, to make it easier to produce the molding element to mould such a recess. In this example, each cavity 51 of a first type is of conical shape, the vertex of the cone being situated towards the inside of the tread. The angle A of the generatrix of each cone is equal to 20 degrees.

FIG. 5 is a cross section through an alternative form of recess according to the invention. In this alternative form, between each cavity of 51 of a first type comprises a cavity part of constant section 511 and a part of variable and decreasing section 510, the part of constant section 511 being positioned towards the inside of the tread with respect to the part of variable section 510. The part furthest towards the inside of the recess is formed of a hemispherical part 513 of a diameter substantially equal to the diameter of the contour of intersection of the recess with the tread surface in the new condition.

FIG. 6 shows an element of material 1' of tread comprising a recess 5 comprising several cavities 51 of a first type and, interposed between two cavities 51 of a first type, a cavity of a second type 52. This cavity of a second type 52 is delimited by a wall 520 of which the intersection with a surface parallel to the tread surface in the new condition and passing through the points furthest towards the outside of the said wall forms a closed contour of a length equal to the length Ci of the interior contour of the cavity of the first type 51 to which this cavity of the second type 52 is connected and which is situated above the cavity 52, that is to say between the cavity of the second type and the tread surface. Further, this cavity of the second type is connected to a cavity of the first type which is situated below it (that is to say nearer to the bottom of the recess) by a contour of a length equal to the length Ce of the exterior contour of the said first-type cavity situated below it.

For preference, the depths P2 of the cavities of the second type 52 are very much less than the depth P1 of the cavities of the first type. One benefit of these cavities of the second type 52 is that it makes the molding element easier to demold.

Figure 7:
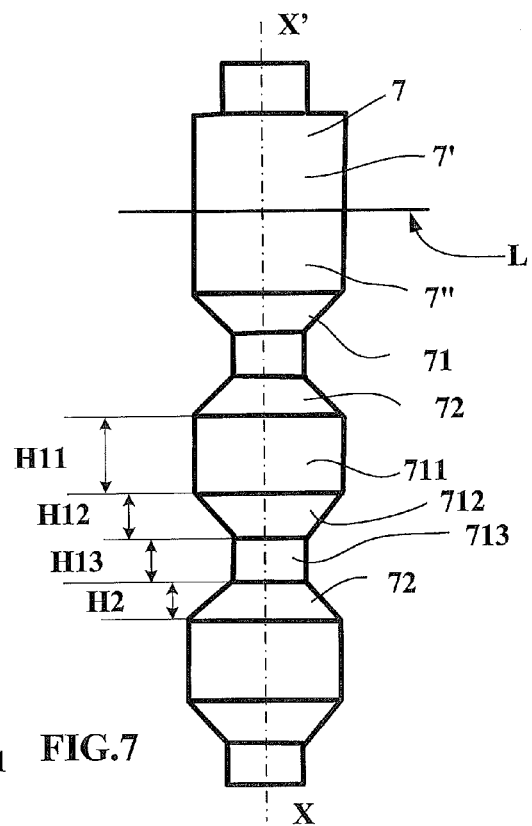
FIG. 7 shows a molding element for molding a recess like the one depicted in FIG. 6.

FIG. 7 shows a molding element 7 intended to be fitted in a mould for molding a recess 5 as shown in FIG. 6. This molding element 7 with an axis of symmetry XX' comprises an internal part 7' intended to be fixed into a tread mould, this part being extended beyond the limit L by an external part 7" intended to project into the mould to mould a recess according to the invention. This element 7 comprises, on its external part 7", an alternation of parts 71 for molding cavities of a first type and a part 72 for molding cavities of a second type. In the case shown, all the parts 71 are substantially identical to one another and all the parts 72 are also identical to one another. In this example shown with FIG. 7, each part 71 of a first type comprises a cylindrical part 711 of length H11 equal to 0.83 mm, extended by a frustoconical part 712 of length H12 equal to 0.40 mm and ends in a cylindrical part 713 of length H13 equal to 0.50 mm and having a diameter smaller than the diameter of the cylindrical part 711. Each part 72 of a second type is of frustoconical shape (the virtual vertex of the cone being situated towards the tread surface) and of length H2 equal to 0.40 mm. The lengths of the various parts are considered parallel to the axis XX' of the molding element. Of course, a person skilled in the art will be able to adapt the dimensions and geometries of each of the said parts in order to obtain the best effects.

Figure 8:
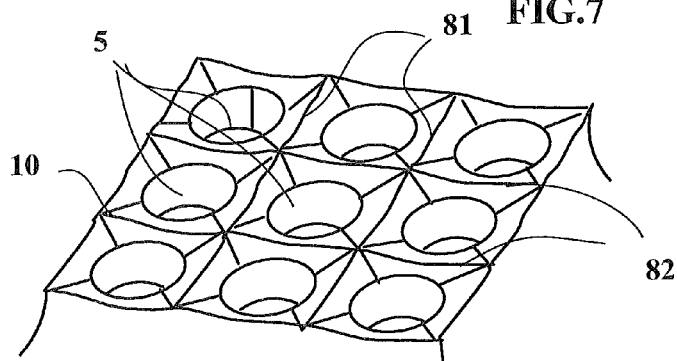
FIG. 8 shows a view of the tread surface of a tread band for which the exterior contours of the recesses are adjacent to one another in order to create contact lines or edges.

FIG. 8 shows a part of a tread surface 10 of a tread band according to the invention for which, on the tread surface, the recesses 5 are arranged so that they open onto the tread surface in such a way as to form a network of lines of contact 81, 82, these lines of contact being substantially directed in mutually perpendicular directions. In this particular case, the minimum distance, measured on the tread surface of the tread band in the new condition, separating two recesses is zero. The advantage of such an alternative form lies in the increase in contact pressure along these lines of contact in order to improve the clearance of particles present on the road surface into the recesses.

Figure 9:
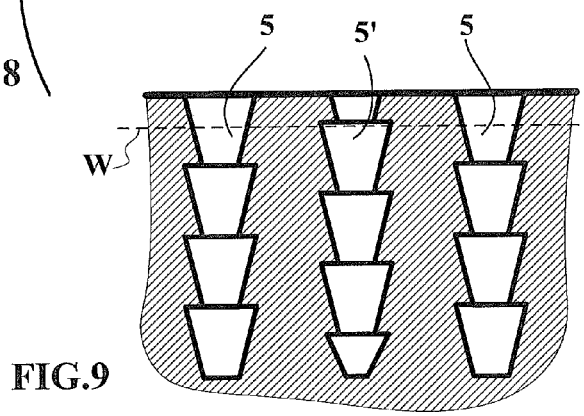
FIG. 9 shows an alternative form of tread band with two types of recess.

In the alternative form which has just been discussed in conjunction with FIG. 8, all the recesses have the same geometry and open onto the tread surface with the same contour irrespective of the level of tread wear. However, it is entirely possible to provide different shapes (or a different number N of cavities) for some of the recesses. One advantageous embodiment—shown in FIG. 9—is to have both recesses like those shown in FIG. 2 (the first cavity having a depth H1) and others with a shape corresponding to the same recesses but having a first cavity of depth equal to half the depth H1 opening onto the tread surface in the new condition. This FIG.

9 actually shows a cross section through a tread band comprising a plurality of recesses 5, 5'. The recesses 5 correspond to the recesses in FIG. 2 while the recesses 5' are substantially of the same geometry but phase shifted to the recesses 5. Thus, following partial wear down to the level symbolized by the dotted line W, whereas the recesses 5 are becoming less effective, the recesses 5' open onto the tread surface with a contour of a larger size in order to maintain appropriate effectiveness. Thus and on average, the condition of the tread surface remains substantially the same irrespective of the level of wear.

This last alternative from is particularly advantageous with recesses comprising cavities of the second type like those shown in FIG. 6.

The invention claimed is:

1. A tread band for a tire, this tread band being provided with a plurality of grooves delimiting elements in relief, these grooves having a depth H, this tread band having a tread surface designed to come into contact with the road surface during running, the tread surface comprising, on a plurality of its elements in relief, a plurality of recesses of total depth H*, each recess comprising at least two cavities of a first type of cavities, each of these cavities of a first type being delimited by a main wall and having a depth Hi, the main wall of each cavity of the first type is such that its intersection with a virtual surface parallel to the running surface in the new condition and passing through the points of the said wall that are furthest towards the outside of the tread forms an exterior contour that is closed and of length Ce, the main wall of each cavity of the first type is such that its intersection with a virtual surface parallel to the running surface in the new condition and passing through the points of the main wall furthest towards the inside of the tread forms an interior contour which is closed and of length of length Ci, wherein the cavities of a first type are arranged in such a way as to succeed one another in a direction oriented from the tread surface towards the inside of the tread strip, that is to say so that the external contour of a cavity of a first type of recess is located, in the direction of the thickness of the tread, at a distance from the tread surface in the new condition which is greater than or equal to the distance separating the internal contour of the preceding cavity from the same tread surface, and in that the length Ce of the exterior contour of a cavity is greater than the length Ci of the interior contour of the same cavity, this tread band further having a cavity of a second type inserted between two cavities of a first type, wherein such cavity of the second type being delimited by a wall of which the intersection with a surface parallel to the tread surface in the new condition and passing through the outermost points of the said wall forms a closed contour of length equal to the length Ci of the interior contour of the cavity of the first type to which this cavity of the second type is connected, this cavity of the second type being connected to a first-type cavity of rank i+1 by a contour of a length equal to the length Ce of the exterior contour of the said cavity of rank i+1, and wherein the depths of the cavities of the second type are less than the depths of the cavities of the first type wherein the length Ci of the closed interior contour of at least the cavity furthest towards the inside of the tread (that is to say the cavity of rank N) is equal to zero or substantially close to zero.

2. The tread band according to claim 1 wherein each cavity of a first type is of conical shape, the vertex of the cone being situated towards the inside of the tread.

3. The tread band according to claim 2 wherein the angle of the generatrix of the cone is comprised between 2 degrees and 30 degrees.

4. A tread band for a tire, this tread band being provided with a plurality of grooves delimiting elements in relief, these grooves having a depth H, this tread band having a tread surface designed to come into contact with the road surface during running, the tread surface comprising, on a plurality of its elements in relief, a plurality of recesses of total depth H*, each recess comprising at least two cavities of a first type of cavities, each of these cavities of a first type being delimited by a main wall and having a depth Hi, the main wall of each cavity of the first type is such that its intersection with a virtual surface parallel to the running surface in the new condition and passing through the points of the said wall that are furthest towards the outside of the tread forms an exterior contour that is closed and of length Ce, the main wall of each cavity of the first type is such that its intersection with a virtual surface parallel to the running surface in the new condition and passing through the points of the main wall furthest towards the inside of the tread forms an interior contour which is closed and of length of length Ci, wherein the cavities of a first type are arranged in such a way as to succeed one another in a direction oriented from the tread surface towards the inside of the tread strip, that is to say so that the external contour of a cavity of a first type of recess is located, in the direction of the thickness of the tread, at a distance from the tread surface in the new condition which is greater than or equal to the distance separating the internal contour of the preceding cavity from the same tread surface, and in that the length Ce of the exterior contour of a cavity is greater than the length Ci of the interior contour of the same cavity, this tread band further having a cavity of a second type inserted between two cavities of a first type, wherein such cavity of the second type being delimited by a wall of which the intersection with a surface parallel to the tread surface in the new condition and passing through the outermost points of the said wall forms a closed contour of length equal to the length Ci of the interior contour of the cavity of the first type to which this cavity of the second type is connected, this cavity of the second type being connected to a first-type cavity of rank i+1 by a contour of a length equal to the length Ce of the exterior contour of the said cavity of rank i+1, and wherein the depths of the cavities of the second type are less than the depths of the cavities of the first type wherein each cavity of a first type comprises a cavity part of constant section and a part of a variable and decreasing section, the part of constant section being positioned on the inside of the tread in relation to the part of variable section.

5. A tread band for a tire, this tread band being provided with a plurality of grooves delimiting elements in relief, these grooves having a depth H, this tread band having a tread surface designed to come into contact with the road surface during running, the tread surface comprising, on a plurality of its elements in relief, a plurality of recesses of total depth H*, each recess comprising at least two cavities of a first type of cavities, each of these cavities of a first type being delimited by a main wall and having a depth Hi, the main wall of each cavity of the first type is such that its intersection with a virtual surface parallel to the running surface in the new condition and passing through the points of the said wall that are furthest towards the outside of the tread forms an exterior contour that is closed and of length Ce, the main wall of each cavity of the first type is such that its intersection with a virtual surface parallel to the running surface in the new condition and passing through the points of the main wall furthest towards the inside of the tread forms an interior contour which is closed and of length of length Ci, wherein the cavities of a first type are arranged in such a way as to succeed one another in a direction oriented from the tread surface towards the inside of the tread strip, that is to say so that the external contour of a cavity of a first type of recess is located, in the direction of the thickness of the tread, at a distance from the tread surface in the new condition which is greater than or equal to the distance separating the internal contour of the preceding cavity from the same tread surface, and in that the length Ce of the exterior contour of a cavity is greater than the length Ci of the interior contour of the same cavity, this tread band further having a cavity of a second type inserted between two cavities of a first type, wherein such cavity of the second type being delimited by a wall of which the intersection with a surface parallel to the tread surface in the new condition and passing through the outermost points of the said wall forms a closed contour of length equal to the length Ci of the interior contour of the cavity of the first type to which this cavity of the second type is connected, this cavity of the second type being connected to a first-type cavity of rank i+1 by a contour of a length equal to the length Ce of the exterior contour of the said cavity of rank i+1, and wherein the depths of the cavities of the second type are less than the depths of the cavities of the first type wherein the minimal distance, on the tread surface when the tread is in the new condition, separating two cavities, is less than or at most equal to 0.4 millimeters.

6. The tread band according to claim 5 wherein the number N of cavities of a first type of each recess is an integer ranging from 2 to 8.

7. The tread band according to one of claim 5, wherein the lengths of the exterior contours of the walls of the cavities of a first type are all equal to one another.

8. The tread band according to claim 5 wherein the interior and exterior contours of the cavities of a first type are of circular shape.

9. The tread band according to claim 8 wherein the diameter of the cavities of the first type is at least equal to 0.8 millimeters and at most equal to 1.6 millimeters.

10. The tread band according to claim 5 wherein the total volume of the cavities of the recesses of the first type and of the second type per unit area on the tread surface is at least equal to 0.25 cubic millimeters ($mm^3$) and at most equal to 20 cubic millimeters ($mm^3$).

11. The tread band according to claim 5 wherein each cavity of a first type is of conical shape, the vertex of the cone being situated towards the inside of the tread.

12. The tread band according to claim 5 wherein the angle of the generatrix of the cone is comprised between 2 degrees and 30 degrees.

13. A tread band for a tire, this tread band being provided with a plurality of grooves delimiting elements in relief, these grooves having a depth H, this tread band having a tread surface designed to come into contact with the road surface during running, the tread surface comprising, on a plurality of its elements in relief, a plurality of recesses of total depth H*, each recess comprising at least two cavities of a first type of cavities, each of these cavities of a first type being delimited by a main wall and having a depth Hi, the main wall of each cavity of the first type is such that its intersection with a virtual surface parallel to the running surface in the new condition and passing through the points of the said wall that are furthest towards the outside of the tread forms an exterior contour that is closed and of length Ce, the main wall of each cavity of the first type is such that its intersection with a virtual surface parallel to the running surface in the new condition and passing through the points of the main wall furthest towards the inside of the tread forms an interior contour which is closed and of length of length Ci, wherein the cavities of a first type are arranged in such a way as to succeed one another in a direction oriented from the tread surface towards the inside of the tread strip, that is to say so that the external contour of a cavity of a first type of recess is located, in the direction of the thickness of the tread, at a distance from the tread surface in the new condition which is greater than or equal to the distance separating the internal contour of the preceding cavity from the same tread surface, and in that the length Ce of the exterior contour of a cavity is greater than the length Ci of the interior contour of the same cavity, this tread band further having a cavity of a second type inserted between two cavities of a first type, wherein such cavity of the second type being delimited by a wall of which the intersection with a surface parallel to the tread surface in the new condition and passing through the outermost points of the said wall forms a closed contour of length equal to the length Ci of the interior contour of the cavity of the first type to which this cavity of the second type is connected, this cavity of the second type being connected to a first-type cavity of rank i+1 by a contour of a length equal to the length Ce of the exterior contour of the said cavity of rank i+1, and wherein the depths of the cavities of the second type are less than the depths of the cavities of the first type wherein the exterior contours of the cavities of all the recesses opening onto the tread surface are of a geometry suited to being adjacent to one another so as to create lines of contact in order to increase the contact pressures along these lines.

14. The tread band according to claim 13 wherein the number N of cavities of a first type of each recess is an integer ranging from 2 to 8.

15. The tread band according to one of claim 13, wherein the lengths of the exterior contours of the walls of the cavities of a first type are all equal to one another.

16. The tread band according to claim 13 wherein the interior and exterior contours of the cavities of a first type are of circular shape.

17. The tread band according to claim 16 wherein the diameter of the cavities of the first type is at least equal to 0.8 millimeters and at most equal to 1.6 millimeters.

18. The tread band according to claim 13 wherein the total volume of the cavities of the recesses of the first type and of the second type per unit area on the tread surface is at least equal to 0.25 cubic millimeters ($mm^3$) and at most equal to 20 cubic millimeters ($mm^3$).

19. The tread band according to claim 13 wherein each cavity of a first type is of conical shape, the vertex of the cone being situated towards the inside of the tread.

20. The tread band according to claim 13 wherein the angle of the generatrix of the cone is comprised between 2 degrees and 30 degrees.

\* \* \* \* \*